Oct. 10, 1939.                P. E. KÖSTER                2,175,631
     GYROSCOPIC APPARATUS FOR DETERMINING THE INCLINATION OF AN AIRPLANE
                          Filed Oct. 17, 1936
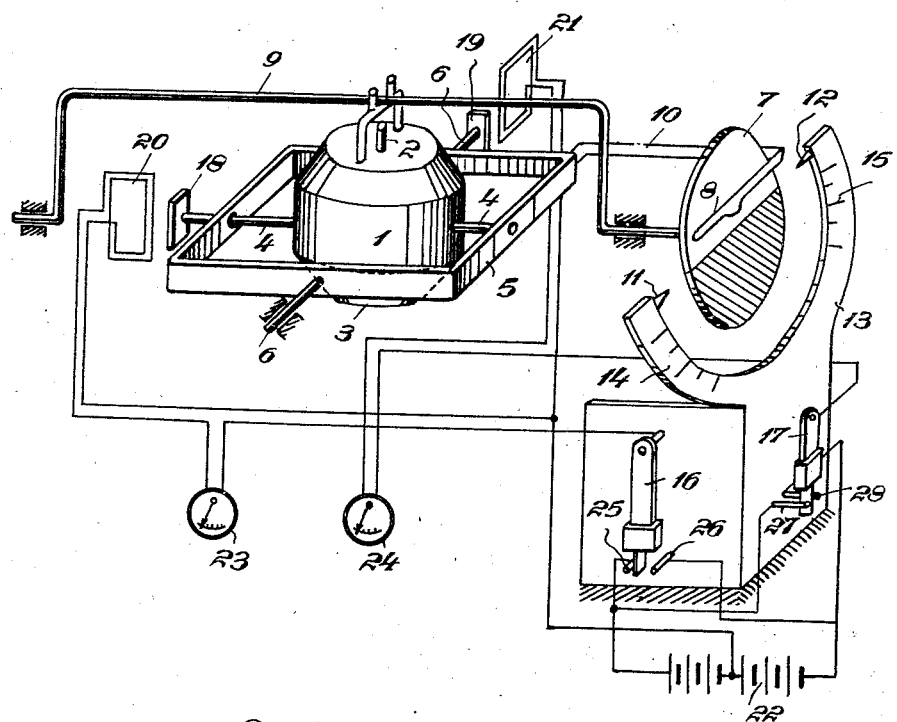
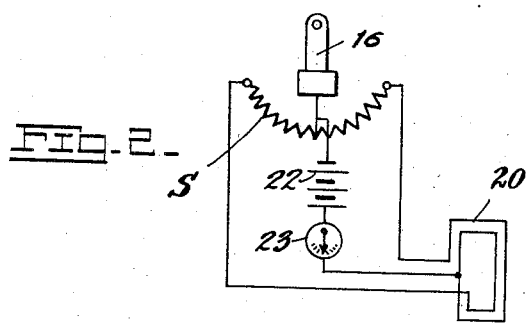
Inventor
Paul Edward Köster
by Knight Bro
        Attorneys Patented Oct. 10, 1939

2,175,631

UNITED STATES PATENT OFFICE 2,175,631

GYROSCOPIC APPARATUS FOR DETERMINING THE INCLINATION OF AN AIRPLANE

Paul Eduard Köster, Berlin-Siemensstadt, Germany, assignor to Siemens Apparate und Maschinen Gesellschaft mit beschrankter Haftung, Berlin, Germany, a corporation of Germany Application October 17, 1936, Serial No. 106,263
In Germany October 18, 1935

5 Claims. (Cl. 33—204)

My invention relates to improvements in gyroscopic apparatus for determining the inclination of a plane, and more especially to such apparatus for producing an artificial horizon adapted to serve for example as a navigation appliance for use in steering aircraft either by hand or automatically. Such gyroscopic apparatus has been known and used for different purposes. It has been found in practice that they do not easily maintain their setting with respect to the particular plane to which they are adjusted but tend to become deflected therefrom. It is already known that this deflection is to be attributed in the main to the friction of the bearings of the gyroscopic device and means have been proposed to automatically bring the device back into the position it should assume, after this has been departed from. It has been proposed to effect this "restoration" of the gyroscope by torques which are exerted on suitable precession axes and which are caused by the divergencies themselves. In such a device pendulums are mounted on the gyroscope carrier so that they can oscillate about axes located co-axially with respect to the precession axes and, through the medium of electrical or other energy amplifiers exert such supplementary moments on the gyroscopic device that this constantly tends to retain a predetermined inclination with respect to the pendulum arrangement. If for example the gyroscopic device presents an artificial horizon for aircraft, then with the known device two pendulums are provided which when the aircraft is stationary or is flying straight, point perpendicularly downward and are so connected with the carrier of the gyroscopic device that when the axis of the gyroscope diverges from the vertical they cause this axis to be brought back into the vertical position by means of the supplementary moment applied. Whilst in this way the position of the artificial horizon is ensured in the case of straight flight, this does not occur when the aircraft flies on a curve. In this case, the supervising pendulums no longer adjust themselves in the true vertical position but in the apparent vertical determined by the radius of the curve of flight and the velocity of travel. The consequence of this is that on curved flight the gyroscopic artificial horizon is, by means of the relative movement of a pendulum and the operation of the energy amplifier, rotated out of its correct position until the axis of rotation of the gyroscope lies in the apparent vertical, and thereby again assumes its previous position with respect to the pendulums. The artificial horizon then no longer shows the true position of the horizon plane but an "apparent horizon" which is a plane perpendicular to the apparent vertical. It is, however, generally desired when flying on a curve and, indeed, particularly when so flying, to obtain a correct indication of the true horizon independently of the form of the curve.

The gyroscopic appliance according to the invention enables this object to be achieved. The appliance according to the inventor dispenses with taking the position of the gyroscope with respect to the apparent vertical of a pendulum arrangement as the measure for the restoration of the gyroscope. According to the invention the position of a body freely rotatable with respect to the gyroscope as compared with the apparent vertical of this body is employed as such a measure.

In other words, the present invention instead of producing a corrective force due to the relative motion between the gyroscope and a pendulum, utilizes the relative motion between a pendulum and a body that moves independently of the gyroscope. During curved flight, when the craft assumes the proper attitude for the particular curve the body maintains the same position relative to the pendulum as during flight in a straight path and since the gyroscope is not a part of the corrective device the effect on the gyroscope of the acceleration due to the curvature of the path does not produce a restorative effect as in the prior art devices. The method of operation and the advantages of the arrangement according to the invention as also further details thereof will appear from the following description with reference to the accompanying diagrammatic drawing in which a gyroscopic artificial horizon for an aircraft has been chosen as an example.

Referring to the drawing,

Fig. 1 is a view illustrating the complete device; and

Fig. 2 is a view illustrating the details of a modification of the pendulum controlled circuit.

In the drawing, 1 indicates an artificial horizon gyroscope driven in any suitable manner, the axis of rotation 2 of which is to be maintained in the true vertical. The gyroscope is mounted in a casing 3 which is carried by means of a spindle 4 in a Cardan ring 5. The Cardan ring itself is carried by means of trunnions 6 in bearings fixed relatively to the aircraft. The indication of the position of the gyroscope is given by means of a horizon disc 7 and an aircraft model 8. Rotational movements of the gyroscope about the spindle 4 lying parallel to the direction of flight are transferred by means of a crank 9 to the disc 7 while rotational movements of the gyroscope about the trunnions 6 produce upward and downward movements of the aircraft model 8 which is rigidly connected by an arm 10 with the Cardan ring 5. The position of the aircraft with respect to the gyroscope horizon of the disc 7 can be read off on two pointers 11 and 12 provided on a body 13 which is mounted independently of the horizon disc and in the present example is assumed as being fixed to the aircraft. The aircraft model 8 and the horizon line of the disc 7 coincide with the marks 11 and 12 when the aircraft takes up a normal horizontal position. Inclinations of the aircraft about the longitudinal axis can be read off on a further scale 14, 15 provided on the body 13. The pilot can thus by observing the indicating members 7, 8, 11, 12 keep the aircraft in the horizontal position.

Two pendulums 16 and 17 are mounted on the body 13 so that they can oscillate about axes perpendicular to each other. The pendulum 16 responds only to rotational movement of the aircraft about the transverse axis while the other pendulum 17 responds only to rotational movement of the aircraft about its longitudinal axis. When either of these pendulums diverges from its central position, a corresponding electric circuit is closed which results in the restorative moment being supplied to the corresponding precession axis of the gyroscope. This takes place in the following manner: On one end of the spindle 4 and trunnion 6 small permanent magnets 18 and 19 respectively, are mounted opposite to which magnet coils 20 and 21 are positioned in such a manner that the fields of the coils by acting on the magnets can exert torques on the elements 4 or 6. The ends of the coils 20 and 21 are connected on the one hand with the centre point of a source of current 22 and on the other hand through measuring instruments 23 and 24 with the pendulums 16 and 17. The pendulums tend always to adjust themselves in the direction of the apparent vertical. If now the body 13 on which the pendulums are suspended, varies its position with respect to the apparent vertical then the pendulums come into contact with corresponding contact pins 25 or 26, 27 or 28 and thereby close circuits through the coil 20 or the coil 21 which in the above described manner exert supplementary moments on the elements 4 and 6 of the precession axes.

The method of operation of the gyroscopic apparatus above described is as follows:

In straight flight the pilot steers the aircraft so that the indicating members 7 and 8 show adherence to the horizontal position. The pendulums hang parallel to the apparent vertical which in this case is identical with the true vertical and they are not in contact with the contact pins 25 to 28, since the body 13 which is in fixed relation to the aircraft will not have varied the inclination determined by the pendulums and the contact pins relative to its apparent vertical.

Now let it be assumed that for some reason, such for example, as the concurrence of increased bearing friction, the gyrodscope becomes deflected from the horizontal plane in such a manner that the crank 9 becomes displaced out of the plane of the drawing towards the observer. The disc 7 is thereby rotated so that the terminal points of the horizontal line are no longer opposite the indicating marks 11 and 12 and the terminal point which was previously located opposite the mark 11 travels over the scale 14. The pilot now reacts to this movement by endeavouring to restore the transverse axis of the aircraft to the horizontal position by controlling actions which so incline the body 13 and with it the aircraft that the indicating marks 11 and 12 again come opposite the terminal points of the horizontal line on the disc 7. This inclination or rotational movement about the longitudinal axis varies the aircraft position with respect to its apparent vertical. Upon such rotational movement the pendulum 17 remaining in the apparent vertical, that is in the true vertical when in straight flight, responds and thereby touches the contact 27. A circuit is thereby closed from the left hand portion of the current source 22 through the contact 27, the pendulum 17, the indicating instrument 24 and the magnet coil 21 and a torque is thus exerted on the trunnion 6 which corrects the gyroscope and thus carries back the crank 9 into the plane of the drawing. The disc 7 again shows a difference of inclination between the horizontal line thereon and the body 13 but in the opposite direction to the previous one, that is, the terminal point of the horizontal line opposite the indicator mark 12 travels over the scale 15. The pilot again actuates the controls so that the indication marks 11, 12 and the artificial horizon line on the disc 7 coincide and thereby the body 13 and the aircraft are brought into the position they should occupy with respect to the apparent vertical. When this position is attained the contact 17, 27 opens automatically and the restoration moment exerted on the trunnion 6 disappears. Thus, if a divergence of the gyroscopic artificial horizon occurs during straight flight, in consequence of the divergence of the gyroscope the control or steering movements effected by the pilot give the body 13 a divergence with respect to its own apparent vertical. In this way restoring moments are produced which restore the gyroscopic apparatus to the correct position and the body 13 is again adjusted by the actuation of the controls into its corrected position with respect to the artificial horizon which is now indicating correctly.

All the steps in the procedure described actually take place in rapid succession the pilot having nothing further to do than to operate the controls to keep the two marks 11 and 12 in register with the artificial horizon line of the disc 7. The pilot may, however, be relieved of even this slight steering or control operation if as is more fully explained below, an automatic supplementary control is employed for this purpose.

Hitherto the behaviour and the service of the gyroscopic apparatus according to the invention has been described with respect to straight flight. It is, however, an important advantage of the apparatus as compared with the known artificial horizons, that the use of the device of the present invention also ensures a reliable restoration of the gyroscope during the curved flight of the aircraft. This will appear from the following considerations: If the aircraft and therefore the body 13 lies correctly in respect to the curve of the flight, then the position of the body 13 with respect to its apparent vertical does not alter. The apparent vertical which coincides in straight flight with the true vertical, will have rotated with the aircraft about the longitudinal axis of the latter, but the pendulums 16 and 17 will not have moved relatively to the body 13 as they also have assumed the apparent vertical and the restoration circuits will remain open and the gyroscope 1 will retain its correct position with respect to the true horizon so that the correct inclination of the aircraft to the true horizon will be indicated on the scale 14 or 15 depending upon the direction in which the aircraft turns. If the gyroscope should become deflected due to friction or other cause and the aircraft is steered according to the erroneous indication of the horizon, a relative motion ensues between the body 13 and the pendulums and the restoration moments are made effective by means of the pendulums 16 and 17 in a similar manner to that above described in connection with straight flight. In this way the gyroscope will be restored to its correct position so that the horizon indicates properly. When the craft is operating according to this correct indication no restorative forces are applied and the craft is properly maintained on its curved path. Direct observation of the pendulum mounted within view of the pilot may serve to indicate whether the aircraft lies correctly or incorrectly in the curve. Instead of this, however, the indications of the instruments 23 and 24 may be used because these will show a deflection when one of the pendulums has closed a circuit through one of its contacts, that is, the instruments will indicate a divergence of the aircraft from its apparent vertical.

As hereinbefore mentioned it is not absolutely necessary for the body 13 carrying the pendulums to be fixed relatively to the aircraft as in the above described "aircraft bound" horizon but it may be movable as desired with respect to the aircraft as in the following "space bound" horizon, the only condition being that the pendulums 16 and 17 must be so mounted that they respond to inclinations of the body 13 with respect to its apparent vertical and that the body 13 instead of the craft must be controlled with respect to the gyroscope 1. In this way there may be provided on an aircraft a gyroscopic artificial horizon which is independent thereof and has restoration arrangements which do not necessitate the whole aircraft having to follow all the supplementary control movements above described. This manner of mounting body 13 is particularly advantageous in connection with flight on a curved path, as the craft does not have to be forced out of its correct attitude, in order to produce restorative torques, the body 13 being moved independently of the craft. It has already been pointed out that the supplementary steering of the aircraft or of the body 13 may also be effected automatically. Thus the horizon gyroscope may, for example, be used to actuate a power switch of an automatic steering installation which maintains the aircraft in a prescribed position with respect to the horizon. The automatic steering installation may otherwise be constructed as desired and may be restricted either to stabilization of the aircraft about the longitudinal and the transverse axes or it may be supplementarily influenced by other measuring appliances independent of the gyroscopic device, for example by the speedometer, barometer, drift meter, course indicator, electrical bearing apparatus, blind landing apparatus, turn indicator or the like.

When flying on turns a supplementary inclination varying with the speed of travel and the speed of rotation about the vertical axis with respect to the true horizon must be introduced by hand or automatically. This may be achieved by known means, for example, a combination of the indications of the speedometer and the turn indicator. These means for automatic control must be operatively inserted between the gyroscope and the energy switches of the automatic control and be so operative that assuming a correct position of the gyroscope horizon the aircraft is given the correct longitudinal and transverse inclination for the particular curve flown. When the aircraft assumes the correct position in relation to the curve of the turns flown, the pendulum circuits will be interrupted. If on the contrary— assuming the correct supplementary inclination— the aircraft takes up an incorrect position in relation to the curve this will be a sign that the artificial gyroscopic horizon will have shifted. In this case the pendulum circuits will be closed and the gyroscope again corrected or restored. Furthermore the incorrect position of the aircraft in relation to the curve of flight will be indicated by the instruments 23 and 24.

It is unimportant as regards the invention as to what means are employed for effecting the restoration or correction of the gyroscope. In the example, electro-magnetic means 18, 19, 20 and 21 have been proposed for this purpose. It is however equally possible to employ hydraulic or pneumatic means for this purpose such as are already known for similar purposes. It is also possible, however, instead of simply switching in or out the supplementary moments, to make their values dependent upon the extent of the divergence of the gyroscope. For this purpose instead of the simple contact devices 25, 26, 16 and 27, 28, 17, electrical potentiometers, for example, as shown in Fig. 2 may be employed, provided with tappings which are shifted by the pendulums, or similar mechanical quantitatively operating energy switches may be provided.

The gyroscopic apparatus in accordance with the invention may be used for all purposes for which hitherto known appliances have been used for maintaining the inclination of a plane, and may serve as indicating appliance for hand control, in particular, in blind flying and by means of an automatic control device it may be employed to maintain any desired values, for example, the speed of travel and it may be used to stabilize, or similarly control arrangements such as aiming devices or discharge apparatus on vehicles of any description.

I claim as my invention:

1. An artificial horizon apparatus for maintaining a desired inclination of an aircraft, comprising a gyroscope having a normally vertical rotation axis, a cardanic carrier for said gyroscope pivotally mounted on said craft, means for restoring said rotation axis to normal position upon divergencies therefrom, a body mounted on said craft for movement independent of said gyro carrier and arranged to follow the inclination of said craft, a pendulum mounted on said body, cooperating electrical contacts on said pendulum and body, and an electric connection between said contacts and said restoring means whereby said means are actuated upon relative deflections of said pendulum device and body to actuate said contacts.

2. A gyroscopic apparatus for indicating the inclination of an aircraft relatively to the true horizontal plane, comprising a gyroscope having a normally vertical rotation axis and a normally horizontal precession axis, a carrier forming bearings for said precession axis and having a carrier axis rotatably mounted on said craft, said carrier axis being perpendicular to said rotation axis and said precession axis, a body fixed with respect to the craft, two pendulums mounted on said body each being mounted on a pivot arranged parallel to said precession axis and said carrier axis respectively in fixed relation to said craft, means for separately applying a torque upon said precession axis and upon said carrier axis, a control arrangement disposed between each of said pendulums and said torque means, means responsive to relative movement of said body and each of said pendulums for actuating each of said means in order to correct by said torque, deviations of said rotation axis from a desired position thereof to be maintained in relation to the horizontal, and an indicating system, three indicating elements mounted in the same field of view, one of said elements being in fixed relation to said craft, the other element being connected with said carrier and the third being coupled with said rotation axis for indicating the inclination to be maintained and the deviations of the craft therefrom.

3. A gyroscopic apparatus for indicating a desired inclination of an aircraft relatively to the horizontal plane, comprising a gyroscopic device having a normally vertical rotation axis and a normally horizontal precession axis, a carrier forming bearings for said precession axis and having a carrier axis rotatably mounted on said craft, said carrier axis being perpendicular to said rotation axis and said precession axis, means mounted for movement with the craft, two pendulums carried by said means, each being mounted on a pendulum axis parallel to said precession axis and said carrier axis respectively in fixed relation to said craft, electromagnetic devices for separately applying a correcting torque upon said precession axis and said carrier axis, contacts carried by said mounted means and said pendulums, a current source and an electric system connecting said contacts with said electromagnetic means whereby said electro-magnetic devices are actuated upon relative deflections of said pendulums and mounted means to actuate said contacts.

4. In a gyro vertical for a moving vehicle, the combination with a gyroscope, of means supporting the same for three degrees of freedom, a pendulous device mounted for pivotal movement with respect to said vehicle, a source of power, magnetic means mounted on said gyroscope, electro-magnetic means connected to said source, and electrical gradient means in circuit with said source and said last-named means whereby said pendulous device controls the application of a force to said gyroscope upon pivotal movement of said device with respect to said vehicle, said force varying with the degree of movement of said pendulum.

5. An artificial horizon apparatus for maintaining a desired inclination of an aircraft, comprising a gyroscope having three degrees of freedom, means for applying a torque to said gyroscope, a body mounted on said craft for movement independent of said gyroscope and arranged to follow the inclinations of said craft, a pendulum mounted on said body, electrical contacts on said pendulum and said body, an electric circuit including a power source between said contacts and said torque means whereby said means are actuated upon relative deflections of said pendulum and body to actuate said contacts, and indicating means in said circuit responsive to changes of energy therein whereby the movement of said pendulum is indicated to an observer.

PAUL EDUARD KÖSTER.